United States Patent [19]

Tomita

[11] Patent Number: 4,839,044
[45] Date of Patent: Jun. 13, 1989

[54] MAGNET FILTER

[76] Inventor: Kazuyuki Tomita, 12-7, Yamate-cho 2-chome, Suita-shi, Osaka-fu, Japan

[21] Appl. No.: 251,030

[22] Filed: Sep. 26, 1988

Related U.S. Application Data

[63] Continuation of Ser. No. 1,728, Jan. 7, 1987, abandoned.

[30] Foreign Application Priority Data

Apr. 3, 1986 [JP] Japan .................. 61-49020

[51] Int. Cl.⁴ ............................................. B01D 35/06
[52] U.S. Cl. ................................. 210/222; 184/6.25
[58] Field of Search .............. 210/168, 222, 223, 695; 335/305; 184/6.25

[56] References Cited

U.S. PATENT DOCUMENTS

| 2,613,246 | 10/1952 | Spodig | 335/305 |
| 2,622,699 | 12/1952 | Mills | 184/6.25 |
| 4,773,995 | 9/1988 | Kondo | 210/222 |

FOREIGN PATENT DOCUMENTS

| 562887 | 9/1958 | Canada | 210/222 |
| 35-32225 | 12/1960 | Japan . | |
| 61-7796 | 3/1986 | Japan | 210/222 |
| 61-7797 | 3/1986 | Japan | 210/222 |

OTHER PUBLICATIONS

Morris, William, Editor, *The American Heritage Dictionary*, Houghton Mifflin Co., Boston, 1976, p. 492.

Primary Examiner—W. Gary Jones
Attorney, Agent, or Firm—Wenderoth, Lind & Ponack

[57] ABSTRACT

The known magnet filter in which a permanent magnet piece is wrapped up by a magnetically permeable plate except for at least one magnetic pole surface, is improved. The improvement exists in that the magnetically permeable plate wrapping up a permanent magnet piece is formed in a bag shape with one end opened to the outside, and the permanent magnet is fitted in a deep portion within the bag-shaped magnetically permeable plate so that a space portion may be preserved between an unwrapped surface of the permanent magnet piece and the open end of the magnetically permeable plate for firmly holding adsorbed magnetic metal powder.

2 Claims, 3 Drawing Sheets

FIG. 4
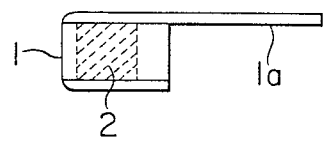
FIG. 5 FIG. 6
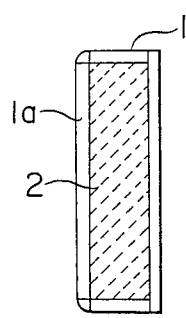 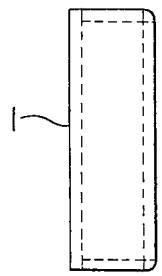
FIG. 7
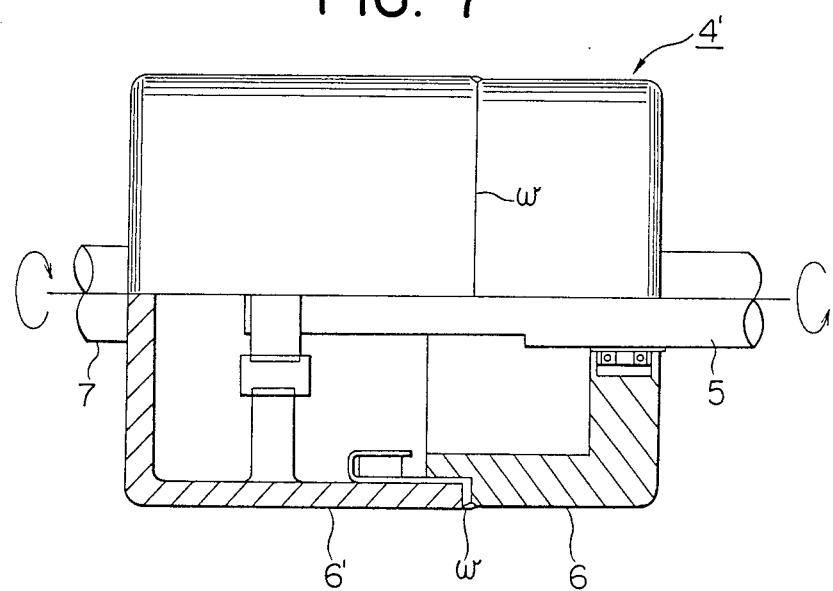

MAGNET FILTER

This application is a continuation of application Ser. No. 07/001,728 filed Jan. 7, 1987, now abandoned.

BACKGROUND OF THE INVENTION

The present invention relates to a magnetic filter adapted to be mounted in a gear box or the like for absorbing magnetic metal powder such as iron powder or the like contained in oil within the gear box.

Heretofore, magnetic filters of this type were formed as shown schematically in FIG. 10, in which a permanent magnet piece (b) was fitted in a box-shaped magnetically permeable plate (a) in such a manner that the front surface of the permanent magnet piece was on the same plane as the opening plane of the box-shaped magnetically permeable plate (a), and the magnetically permeable plate (a) was mounted on an inner wall surface (c) (see FIG. 12) of a gear box or the like to attract or adsorb magnetic metal powder such as iron powder or the like mixed in the oil within the gear box.

The above-mentioned magnetic filter in the prior art had shortcomings such as if adsorbed iron powder (d) approached the saturated adsorption amount vibration or the like was present, the iron powder would be disengaged from the filter and would be dispsered into a region outside of the magnetically permeable plate (a) where the magnetic force is not exerted (See FIG. 11). Also, as the magnetic field (e) extends greatly outside of the magnetic filter beyond the open end portion of the magnetically permeable plate (a), the gear box is apt to be magnetized (See FIG. 12).

SUMMARY OF THE INVENTION

It is therefore one object of the present invention to provide an improved magnetic filter which is free from the above-described shortcomings of the magnetic filter in the prior art.

A more specific object of the present invention is to provide a magnetic filter which can stably hold magnetic metal powder that has been adsorbed without being disturbed by vibration nor by flow of oil, and which hardly magnetizes the object on which it is mounted.

According to one feature of the present invention, there is provided a magnetic filter in which a permanent magnet piece is fited in a deep portion within a bag-shaped magnetically permeable housing whose front end is open, and a space for holding magnetically attracted metal powder is provided between a front surface of the permanent magnet piece and an opening plane at the front end of the bag-shaped magnetically permeable housing.

The magnetic filter according to the present invention is constructed in such manner that a permanent magnet piece is not fitted within a bag-shaped, box shaped or container-like magnetically permeable housing so that a front surface of the magnet piece is positioned in the same plane as an opening plane of the box-shaped magnetically permeable housing as is the case of the prior art. Rather, the magnet is fitted in a deep portion within bag-shaped magnetically permeable housing and a space portion for holding attracted magnetic metal powder is provided between the front surface of the permanent magnet piece and the opening plane of the magnetically permeable housing. When the magnetic filter according to the present invention is mounted in a gear box or the like, magnetic metal powder such as iron powder or the like mixed with oil within the gear box is adsorbed or attracted by the magnetic filter, and is kept adsorbed within the space portion formed in the bag-shaped magnetically permeable housing and is held in a stable state without being disengaged from the magnet filter owing to vibration or the flow of oil.

Moreover, owing to the existence of the above-described space portion, a magnetic field emanating from the permanent magnet piece fitted within the bag-shaped or container-like magnetically permeable housing, does not extend largely outside of the magnet filter beyond the open end portion of the magnetically permeable plate, and hence the object on which the magnetic filter is mounted, is hardly magnetized.

As described above, owing to the fact that a permanent magnet piece is fitted in a deep portion within the bag-shaped magnetically permeable housing and thereby a space portion is provided in a front portion within the magnetically permeable plate, the magnetic filter according to the present invention can firmly hold adsorbed or attracted magnetic metal powder within the space portion so as not to be disengaged from the filter, the magnetic filter can be applied even to a rotary gear box such as a torque converter, and an object on which the magnetic filter is mounted is hardly magnetized.

The above-mentioned and other objects, features and advantages of the present invention will become more apparent by reference to the following description of a preferred embodiment of the invention taken in conjunction with the accompanying drawings.

BRIEF DESCRIPTION OF THE DRAWINGS

In the accompanying drawings:

FIGS. 4, 5 and 6 are side views, partly in cross-section, of the same magnetic filter taken along lines IV—IV, V—V and VI—VI, respectively, in FIG. 2 as viewed in the direction of the arrows;

FIG. 7 is a side view, partly in longitudinal cross-section, showing a magnetic filter according to the present invention as mounted in a rotary gear box;

DESCRIPTION OF THE PREFERRED EMBODIMENT

Figure 1:
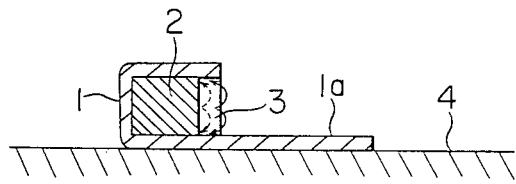
FIG. 1 is a cross-section view of one preferred embodiment of a magnetic filter according to the present invention taken along line I—I in FIG. 2 as viewed in the direction of the arrows.
Figure 2:
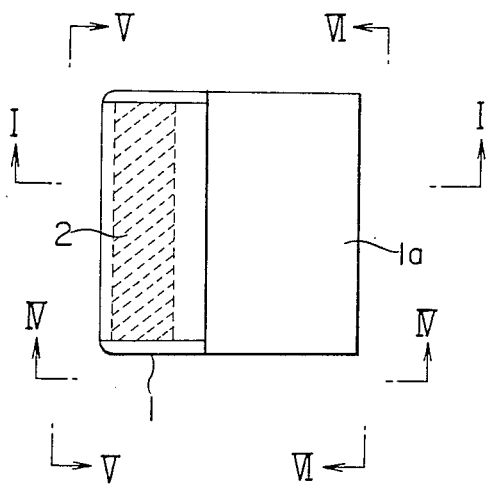
FIG. 2 is a plan view, partly in cross-section, of the same magnetic filter.
Figure 3:
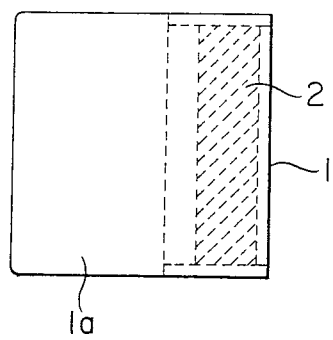
FIG. 3 is a bottom view, partly in cross-section, of the same magnetic filter.

Referring now to FIGS. 1 to 7 of the accompanying drawings which illustrate one preferred embodiment of the present invention, reference numeral (1) designates a bag-shaped magnetically permeable housing made of magnetic metal such as plate or sheet steel or the like, and its one side piece projects to the outside beyond the opening portion of the magnetically permeable housing (1) to form a mounting piece (1a).

A permanent magnet piece (2) is fitted in a deep portion within the magnetically permeable housing (1) and fixedly secured thereto by means of an adhesive or the like, and thereby a space portion (3) for holding magnetic metal powder is formed in front of the permanent magnet piece (2) within the bag-shaped magnetically permeable housing (1).

As the illustrated embodiment is constructed as described above, if the above-mentioned bag-shaped magnetically permeable housing (1) is mounted on an inner wall surface of a gear box (4), iron powder (p) mixed in the oil within the gear box (4) is attracted adsorbed by the permanent magnet piece (2) and held in the space position (3) formed in front of the permanent magnet piece (2).

Figure 8:
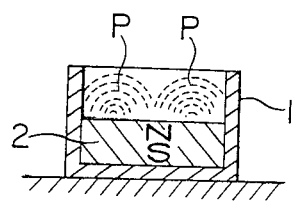
FIGS. 8 and 9, respectively, are schematic views illustrating effects of the magnetic filter according to the present invention.
Figure 11:
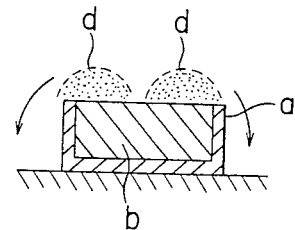
FIGS. 11 and 12, respectively, are schematic views illustrating effects of the same magnet filter in the prior art.

Accordingly, the iron powder (p) once adsorbed in the above-described manner is surrounded and protected by the magnetically permeable housing (1) within the space portion (3), and hence, the iron powder (p) can be held in a stable state within the space portion (3) without being disengaged from the magnet filter by vibration nor by the flow of oil within the gear box (See FIG. 8).

Figure 9:
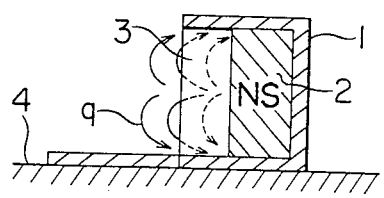
Figure 12:
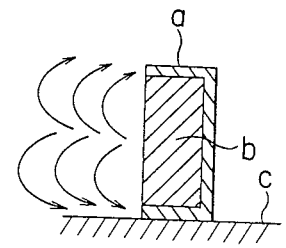
Figure 10:
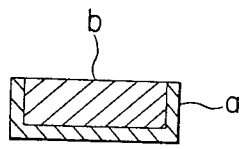
FIG. 10 is a longitudinal cross-section view of a magnetic filter of the prior art.

Furthermore, according to the above-described embodiment, owing to the existence of the space portion (3) formed within the bag-shaped magnetically permeable housing (1), a magnetic field (q) emanating from the permanent magnet piece (2) fitted in the magnetically permeable housing (1) does not project greatly beyond the open end portion of the magnetically permeable plate (1), and so, the gear box (4) is hardly magnetized (See FIG. 9).

FIG. 7 shows a practical example in which the magnetic filter according to the present invention is applied to a rotary gear box such as a torque converter or the like. In this example, a magnetic filter is mounted in a rotary gear box (4') by pinching a tip bent portion of a mounting piece (1a) of the bag-shaped magnetically permeable housing (1) between a cover (6) on the side of an input shaft (5) of the rotary gear box (4') and a cover (6') on the side of an output shaft (7) and welding the above-mentioned covers (6) and (6') with each other along their entire circumference (w).

In this case, iron powder mixed in the oil within the gear box (4') can be separated and adsorbed by the magnetic filter by making use of a centrifugal force exerted upon the oil and a magnetic force generated by the permanent magnet piece (2) and even when the rotary gear box (4') has become still, the iron powder would not be diffused again outside of the magnetic filter owing to the fact that the iron powder can be firmly held within the space portion (3) in the bag-shaped magnetically permeable housing (1).

While a principle of the present invention has been described above in connection to one preferred embodiment of the invention, it is a matter of course that many apparently widely different embodiments could be made without departing from the spirit of the present invention.

What is claimed is:

1. A magnetic filter comprising:
    a container-like magnetically permeable housing, having a plurality of sides and an open end defining a space therein, for containing a magnet;
    a magnet having a plurality of sides, contained in said container-like housing and attached at an end of said housing and spaced from said open end thereof, said magnet having north and south poles and forming a magnetic field within said housing, the spacing between the extent of the magnetic field and said open end being sufficiently great for containing the magnetic field substantially within said housing; and
    said plurality of sides of said housing covering each side of said plurality of sides of said magnet except for one pole of said north and south poles of said magnet, at least one side of said plurality of sides of said housing being a long side, at least one side of said plurality of sides of said housing being a short side, said long side being longer than said short side, said long and short sides extending away from said magnet and past the said except for one pole of said north and south poles of said magnet for defining a subspace of said space in said housing, said subspace being between said magnet and said open end of said housing for containing magnetic particles therein, said long side of said plurality of sides of said housing retaining, when in use, attracted magnetic particles which, under influence of centrifugal forces or forces owing to the flow of magnetic particle-laden material flowing past said container-like housing, overflow the subspace of said container-like housing.

2. A magnetic filter according to claim 1, wherein said long side of said plurality of sides of said housing is a plate-like attachment means for attaching said housing to an object.

* * * * *